(12) United States Patent
Yeung et al.

(10) Patent No.: US 12,439,986 B2
(45) Date of Patent: Oct. 14, 2025

(54) AUTOMATIC GENERATION OF FASHION MANUFACTURING TECH PACKS FROM IMAGES USING COMPUTER VISION

(71) Applicant: MICROSOFT TECHNOLOGY LICENSING, LLC, Redmond, WA (US)

(72) Inventors: Yan Mui Kitty Yeung, Waldorf (DE); Christopher Ward Davis, Portland, OR (US); Evan Roy Chaki, North Bend, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 642 days.

(21) Appl. No.: 17/850,915

(22) Filed: Jun. 27, 2022

(65) Prior Publication Data

US 2023/0354941 A1    Nov. 9, 2023

Related U.S. Application Data

(60) Provisional application No. 63/339,939, filed on May 9, 2022.

(51) Int. Cl.
*A41H 3/00* (2006.01)
*G05B 19/4093* (2006.01)
*G06Q 50/04* (2012.01)
*G06T 7/41* (2017.01)

(52) U.S. Cl.
CPC ....... *A41H 3/007* (2013.01); *G05B 19/40935* (2013.01); *G06Q 50/04* (2013.01); *G06T 7/41* (2017.01); *G05B 2219/45196* (2013.01); *G05B 2219/45222* (2013.01)

(58) Field of Classification Search
CPC ............................... A41H 42/00; A41H 3/007
USPC .................................................. 700/130–132
See application file for complete search history.

(56) References Cited

U.S. PATENT DOCUMENTS

| | | | |
|---|---|---|---|
| 2004/0049309 A1* | 3/2004 | Gardner | A41H 1/00 700/132 |
| 2010/0305909 A1* | 12/2010 | Wolper | G06T 17/00 703/1 |
| 2021/0343083 A1* | 11/2021 | Wilcox | G06Q 30/0643 |

FOREIGN PATENT DOCUMENTS

WO    WO-2019058269 A1 *   3/2019    ......... G06Q 30/0621

* cited by examiner

*Primary Examiner* — Nathan E Durham
(74) *Attorney, Agent, or Firm* — David Foster; Newport IP LLC

(57) ABSTRACT

The techniques disclosed herein analyze a garment design to create, verify, and package technical specifications usable by a manufacturer to produce a garment. Computer vision technologies are applied to an image of the garment to identify fabrics and other materials, notions such as zippers, buttons, drawstrings, etc., and individual panels that will be cut and sewn together to produce the garment. In some configurations, the identified aspects of the garment are analyzed for inconsistencies, omissions, or other errors. A designer of the garment may be prompted to resolve any errors. The confirmed specifications are then exported to a tech pack that conforms to the standards of a manufacturer, including a bill of materials, a list of panels to be cut, and annotations confirming the intent of the designer. A clothing manufacturer may then use the tech pack to configure machines to produce the garment.

20 Claims, 10 Drawing Sheets

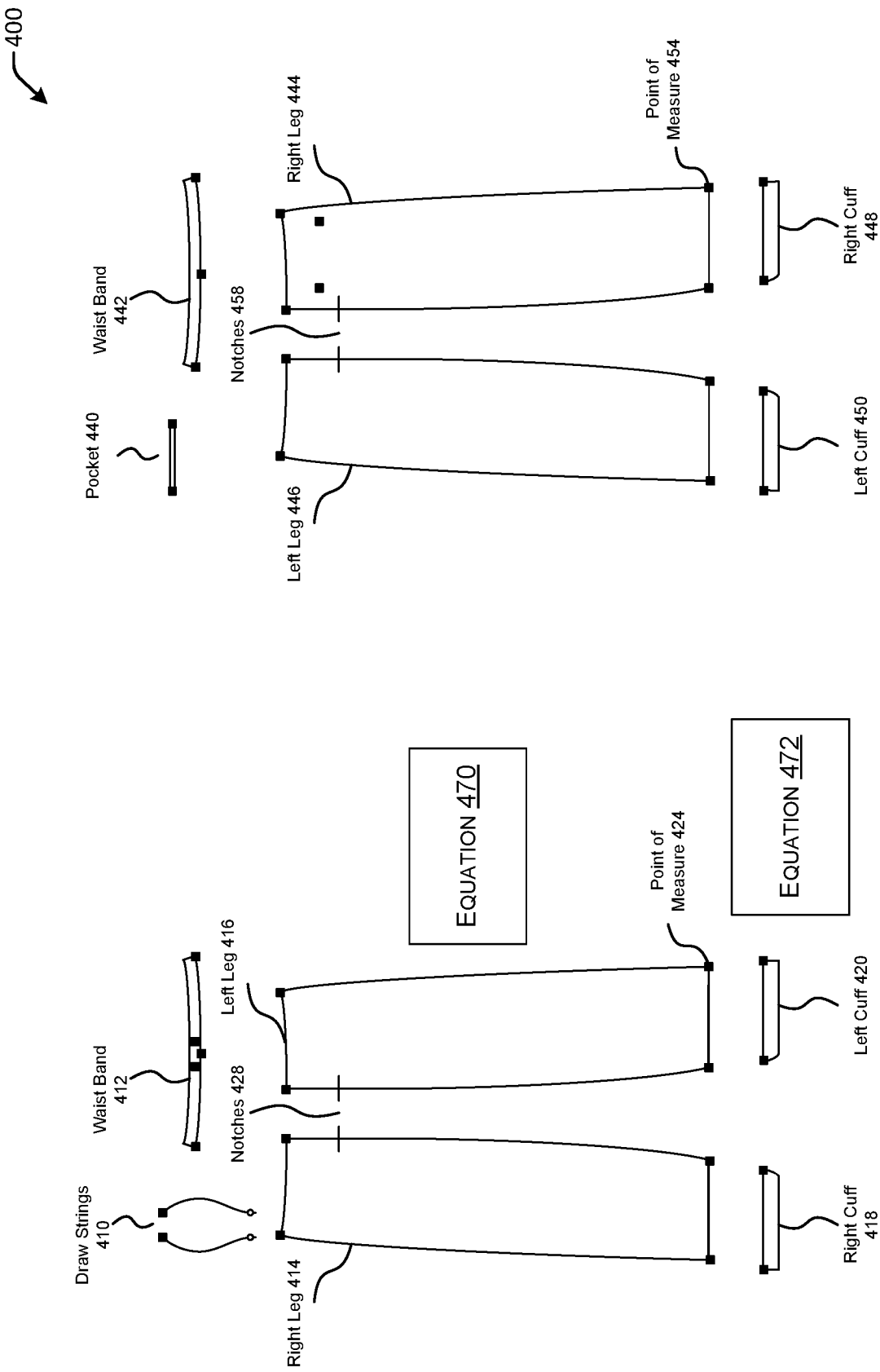

| Identified Attributes 502 | Attribute Values 504 |
|---|---|
| armhole | Edge finishing, hem allowance, stitch type |
| belt | Dimension, stitch type, belt buckle |
| belt loop | Dimension, stitch type |
| bodice | |
| buttons | Buttonhole positions |
| collar | Type, stitch type |
| cuff | Type, stitch type |
| drawcord | Dimension, stitch type |
| gather | Type, stitch type |
| hem | Edge finishing, hem allowance, stitch type |
| neckline front | Edge finishing, hem allowance, stitch type |
| neckline back | Edge finishing, hem allowance, stitch type |
| peplum | |
| pocket | Type, stitch type edge finishing, hem allowance |
| puff | Type, stitch type edge finishing, hem allowance |
| ruffle | Edge finishing, hem allowance, stitch type, pitch |
| sleeve hem | Edge finishing, hem allowance, stitch type |
| side pocket | Edge finishing, hem allowance, stitch type |
| sleeve left | |
| sleeve right | |
| strap | Dimension, stitch type, strap buckle |
| waistline | Edge finishing, hem allowance, stitch type |
| zipper | Dimension, stitch type |
| panels | Fabrics, point of measure |

Technical Flat Front 202

Technical Flat Back 204

FIG. 5

AUTOMATIC GENERATION OF FASHION MANUFACTURING TECH PACKS FROM IMAGES USING COMPUTER VISION

PRIORITY APPLICATION

The present application is a non-provisional application of, and claims priority to, U.S. Provisional Application Ser. No. 63/339,939 filed on May 9, 2022, the contents of which are hereby incorporated by reference in their entirety.

BACKGROUND

The fashion industry is always changing, and new garment designs are constantly being conceived of and submitted to manufacturers for production. However, current technology does not allow fashion designers to communicate their designs effectively and efficiently to clothing manufacturers. To get a design produced by a manufacturer, a designer provides the manufacturer with a "tech pack"—a series of technical requirements that are usable to manufacture the design. A tech pack often consists of a bill of materials, pattern pieces, grading rules for different sizes, samples, and written instructions describing how to construct a physical product. Tech packs also include images that illustrate the design, such as technical flat drawings, sketches, photos, three-dimensional models, etc. With existing technologies, designers are left to create many of these assets by hand, such as computer aided design (CAD) files depicting the design, spreadsheet files listing the bill of materials, and images of the source materials. Furthermore, tech packs are not standardized, leading to a plethora of different requirements and protocols. Reconciling with a manufacturer's specific requirements often involves a time consuming and frustrating back and forth between the designer and the manufacturer.

Even if designers create digital tech packs with design software—i.e. making digital samples rather than physical samples or making digital patterns rather than paper patterns—the files generated are incomplete and incompatible with manufacturer requirements. For example, designers may not have all the information in the bill of materials, or have left out image annotations indicating how to apply finishes. Onboarding a new design at a factory can take as much as 3-6 months. Once a tech pack is complete and meets the standards of the manufacturer, cut-and-sew and shipping of the product can be performed within a day.

Factories do not want to waste time on this back-and-forth with designers, and prefer that designers provide complete and accurate tech packs. Some factories have started to expedite the process by providing a web portal for designers to fill out forms, describing their designs and indicating factory settings. However, this is not the natural way for designers to design, and designers don't have all the knowledge about factory settings. Fundamentally, it has been a challenge to translate a designer's intent, which is recorded in sketches or images, into the technical requirements that manufacturers need to manifest the design.

It is with respect to these and other considerations that the disclosure made herein is presented.

SUMMARY

The techniques disclosed herein analyze a garment design to create, verify, and package technical specifications usable by a manufacturer to produce a garment. Computer vision technologies are applied to an image of the garment to identify fabrics and other materials, notions such as zippers, buttons, drawstrings, etc., and individual panels that will be cut and sewn together to produce the garment. In some configurations, the identified aspects of the garment are analyzed for inconsistencies, omissions, or other warnings. A designer of the garment may be prompted to resolve any errors. The confirmed specifications are then exported to a tech pack that conforms to the standards of a manufacturer, including a bill of materials, a list of panels to be cut, and annotations confirming the intent of the designer. A clothing manufacturer may then use the tech pack to configure machines to produce the garment.

In this way, the bottleneck caused by designers manually generating tech packs can be partially or completely eliminated. In some cases, manufacturers are able to begin "cut-and-sew" immediately upon receiving the tech pack.

In some configurations, a designer first uploads one or more images to what is called the "auto-check" application program interface (API). This API analyzes the image to pull out the bill of materials (BOM), including "notions" such as buttons, zippers, strings, etc. and the panels of fabric that will be sewn together to create the garment. The bill of materials is then returned to the designer for inspection. The designer may provide feedback on the accuracy of the items listed in the bill of materials. This feedback can be used for training of the image analysis algorithm.

Once the initial bill of materials has been created, it may be analyzed for omissions, inconsistencies, and other errors. In some cases, these errors are specific to a particular manufacturer or to a particular format of tech pack. The designer may be consulted to correct any of the identified errors. The designer may also be prompted to annotate or otherwise clarify portions of the bill of materials. By performing a tech-pack specific or manufacturer specific analysis of the bill of materials, errors can be identified and fixed without having to look up and understand each manufacturer's particular formats and requirements. It also saves the time-consuming back and forth needed to fix errors that would otherwise reach the manufacturer.

In some configurations, an aspect of a design may be identified that could be intentional, or that could be a mistake. For instance, a shirt with one sleeve longer than the other could be a mistake or a design choice. In order to avoid a needless round of communication with the manufacturer, the designer may be prompted to acknowledge that the aspect of the design is intentional. For example, the designer may be prompted to annotate the bill of materials to indicate that the different sleeve lengths are intentional.

In some embodiments, natural language processing (NLP) is used through a conversational interface to confirm and fix errors, clarify ambiguities, or otherwise interact with the designer. However, graphical user interfaces to perform these functions are similarly contemplated. Continuing the example of a shirt with sleeves of different lengths, computer vision may be used to identify the different lengths, while natural language processing may be used to confirm whether the different lengths were intentional. For example, natural language processing could be used to ask the question: "should one sleeve be longer than the other?". If a designer answers "no" then the computer vision component can automatically fix the image. If the designer answers "yes" then the design will not be updated.

One benefit of the disclosed systems is to bridge the gap between the creative process of designing a garment and the manufacturing process where the garment is made. This gap exists because fundamentally there is a discrepancy between very creative people that think in pictures and machines that operate based on objective data. Another benefit of the disclosed systems is to reduce the amount of computing and network resources consumed in the process of designing and manufacturing a garment.

One goal of the disclosed embodiments is to reduce or eliminate how long it takes from submission of a tech pack to a manufacturer until garments are being produced. Achieving this goal will enable on-demand garment manufacturing and mass customization of garments. In addition to the strategic advantage enabled by quickly updating designs, reduced manufacturing time will also significantly reduce the amount of waste generated by producing and shipping garments. For example, reducing the amount of time it takes to manufacture a garment enables on-demand ordering. The ability to order a garment on-demand allows garments to be produced in response to actual demand, and not ordered in bulk in advance before the actual demand is known.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 illustrates 2D patterns of the design which are composed of panels of fabric.

FIG. 5 illustrates a bill of materials that includes the notions and panels needed to manufacture the designed garment.

DETAILED DESCRIPTION

Figure 1:
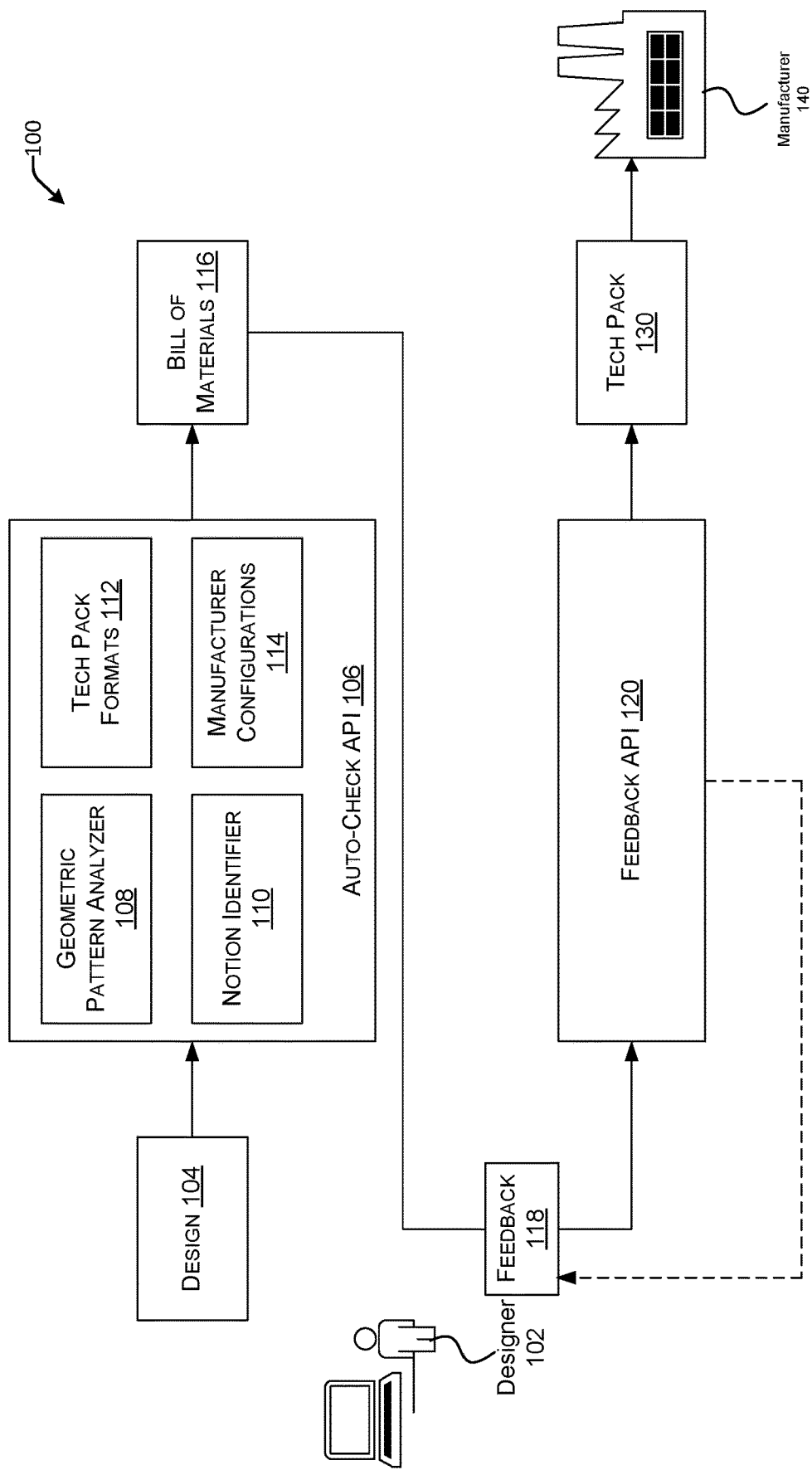
FIG. 1 illustrates an architecture of a computer-vision based system for generating tech packs.

FIG. 1 illustrates an architecture of a computer-vision based system for generating tech packs. Designer 102 may be a visual designer, a clothing designer, an artist, or any other individual or group of people who would like to create a new garment. Designer 102 creates design 104, which may be a sketch drawn by hand, a drawing generated with a computer, a picture, a 3D rendering, or any other image-based representation of a design. Design 104 may be a flat image, e.g. the result of scanning a drawing. Design 104 may also be computer generated description of an image, such as a vector graphics image file that defines the design mathematically in terms of lines, curves, and points. One example of a sketch used to depict a garment is a "technical flat"—a drawing of garments that depict the contours of the garment, including the relative sizes and shapes of different portions of the garment. Design 104 may also include notions such as buttons, zippers, drawstrings, and other adornments.

Designer 102 provides design 104 to auto-check API 106, which performs an initial analysis of design 104. Design 104 may include one or more wholistic sketches of the garment, such as technical flats, which represent the garment as a series of 2D drawings from different perspectives. Additionally, or alternatively, design 104 may include one or more sets of individual panels that when combined constitute a wholistic portion of the garment. For example, one set of individual panels may represent the front of a shirt, while another set of individual panels may represent the back of the shirt. Wholistic sketches may be hand drawn or computer drawn, while designs defined by individual panels are most likely computer drawn, often by a purpose-built application. When design 104 consists of panels, each panel may be marked with one or more points of measure or notches. points of measure and notches are discussed in more detail below in conjunction with FIG. 4.

If design 104 includes wholistic sketches, geometric pattern analyzer 108 segments the wholistic sketches into constituent panels. Panels define a pattern which when cut out of fabric and sewn together by manufacturer 140 become one portion of the garment. Geometric pattern analyzer may identify panels using computer vision algorithms to identify points, lines, curves, and other boundaries. Geometric pattern analyzer may use algorithms such as Canny Edge Detection, Kovalevsky Edge Detection, or the like, to identify the points, lines, and curves.

Once individual panels have been identified, geometric pattern analyzer 108 may fit lines, splines, or polynomials to mathematically describe the contours of each panel. For example, if a panel is a simple rectangle, geometric pattern analyzer 108 may use a classification algorithm to identify it as such. Once a panel has been identified as one or more geometric shapes, pattern analyzer 108 may identify begin and end points of various lines that make up the shapes. For example, a straight line may be identified by a begin point, an end point, and a slope, where the begin and end points are defined in cartesian (X, Y) coordinates. A curved line may be defined by a begin point and an end point, as well as a series of polynomial coefficients that define a spline.

Once geometric pattern analyzer 108 has segmented wholistic images of design 104—or if design 104 already included sets of panels—Geometric pattern analyzer 108 may identify points of measure along the contours of each pattern. Points of measure may be found at the intersection of individual lines used to mathematically describe the panel. For example, if a panel is identified as a rectangle, then points of measure may be placed at the four corners. Points of measure may also be placed along the contour of a panel where the panel is determined to fit into a different panel such as where a sleeve meets an armhole on a shirt. Geometric pattern analyzer 108 determines that two panels fit together by identifying segments of each panel with the same or substantially similar shape, such that the panels could be joined at the segments.

Auto-check API 106 may also apply notion identifier 110. Notion identifier 110 may apply a neural network-based algorithm to identify notions—e.g. zippers, buttons, pockets, cuffs, pleats, and other aspects or adornments of the garment. Notion identifier 110 may also infer materials that the notions are made out of. For example, notion identifier 110 may distinguish a brass button from a plastic button.

In some configurations, tech pack formats 112 define the format of a bill of materials, a spec sheet, a sizing rule, or any other document that is included in a tech pack generated by auto-check API 106. When uploading design 104, designer 102 may select a target tech pack format of tech pack formats 112. In this way, the data extracted by a geometric pattern analyzer 108 and notion identifier 110 may be formatted according to the expectations associated with the target tech pack 130. Similarly, manufacturer configurations 114 describe formats of these same tech pack components, but tailored to a specific manufacturer 140. Designer 102 may select from the list of tech pack formats 112 or the list of manufacturer configurations 114 when uploading design 104. In other configurations, a tech pack and associated requirements are automatically selected for designer 102 according to the destination manufacturer 140.

Auto-check API 106 applies geometric pattern analyzer 108 and notion identifier 110 in the context of tech pack formats 112 and/or manufacturer configurations 114 to generate bill of materials 116. Bill of materials 116 may list the notions identified by notion identifier 110, including sourcing options from where to obtain them, sizing, color, details on how each notion is affixed to the garment, and the like. Bill of materials 116 may also include mathematical descriptions of the panels identified by geometric pattern analyzer 108, including points of measure.

In some configurations, bill of materials 116 is presented to designer 102 to obtain feedback 118. Bill of materials 116 may be directly copied to a computing device used by designer 102, or bill of materials 116 may be provided to an interactive application used by designer 102 which solicits feedback 118. However it is solicited, bill of materials 116 is presented to designer 102 to identify potential omissions, inconsistencies, unnecessary information, errors, or other types of feedback.

Designer 102 may provide feedback 118, separately or already integrated into bill of materials 116, to feedback API 120. Feedback API 120 may evaluate feedback 118, identify additional errors, update the bill of materials 116, and iteratively supply bill of materials 116 to designer 102 for additional feedback 118. However, when the bill of materials is complete and consistent with the selected tech pack format 112 and/or manufacturer configuration 114, feedback API 120 generates tech pack 130. Tech pack 130 may be automatically provided to manufacturer 140.

Figure 2A:
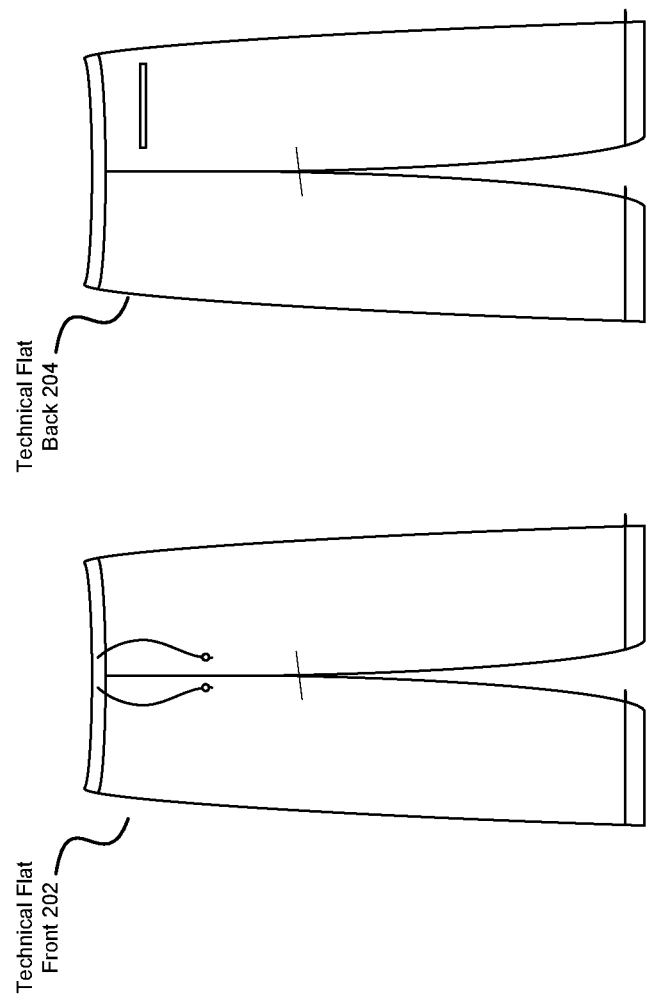
FIG. 2A illustrates technical flats of a garment design.

FIG. 2A illustrates technical flats of garment designs. As referred to herein, garments are articles of clothing, bedding, upholstery, rugs, or any other item created with fabric, leather, carpeting, or similar material. Garments may be designed to have a particular shape, to be adorned with notions, to be made of particular materials, to have particular prints or patterns, or the like. As referred to herein, technical flats are a style of drawing used by designers to illustrate a design. Technical flats may be sketches that are hand drawn, or computer-generated images. Technical flats typically include lines, shading, symbols, patterns, and/or other indications of the intended design.

As illustrated, technical flats 202 and 204 have a cartoonish 2D format that shows details of the features of a piece of garment. Details of the garment may include pockets, seams, zippers, draw cords, and other aspects of a garment. Technical flat front 202 depicts the front of a pair of sweatpants, while technical flat back 204 depicts the rear of the pair of sweatpants. Technical flats 202 and 204 are wholistic depictions of particular perspectives of the garment, as opposed to designs that are already separated into panels.

Figure 2B:
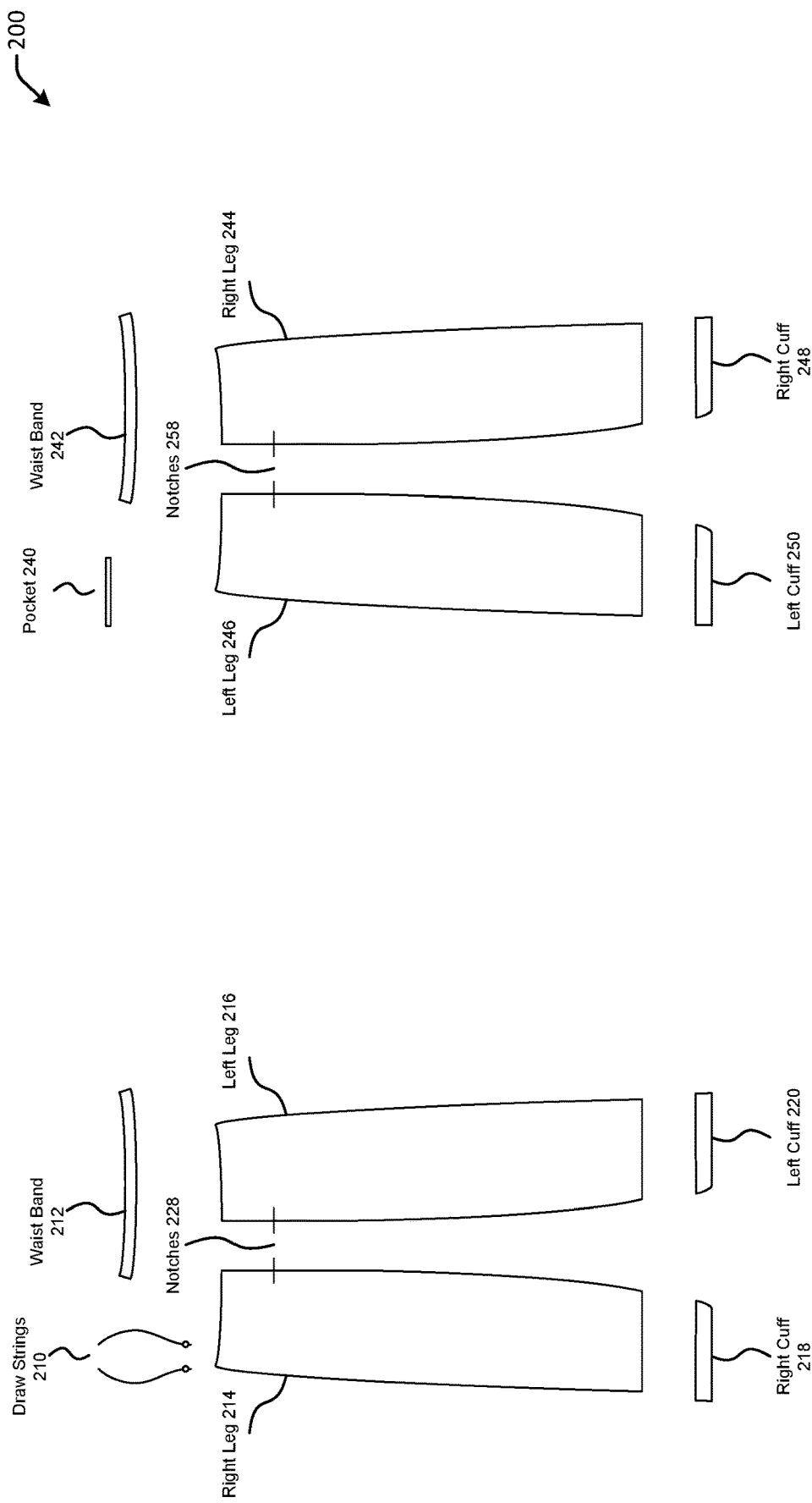
FIG. 2B illustrates a garment design submitted as panels.

FIG. 2B illustrates a format of design 104 that includes individual panels 200 instead of wholistic sketches. Instead of technical flat 202 depicting the front of the sweatpants, drawstrings 210, waistband 212, right leg 214, left leg 216, right cuff 218, and left cuff 220 are explicitly identified as separate panels. Similarly, instead of technical flat back 204 depicting the back of the sweatpants, Pocket 240, waist band 242, right leg 244, left leg 246, right cuff 248, and left cuff 250, are individually identified as panels. FIG. 2B also illustrates notches 228 and 258. Notches are markings indicating exactly where two panels are to be sewn together. In some configurations, when decomposing a wholistic design into panels, geometric pattern analyzer 108 adds notches to the panels to maintain the alignment from the wholistic design. For example, notches may be placed on two panels that were adjacent in the wholistic design such that aligning the notches of the panels recreates the layout of the wholistic design.

Figure 3:
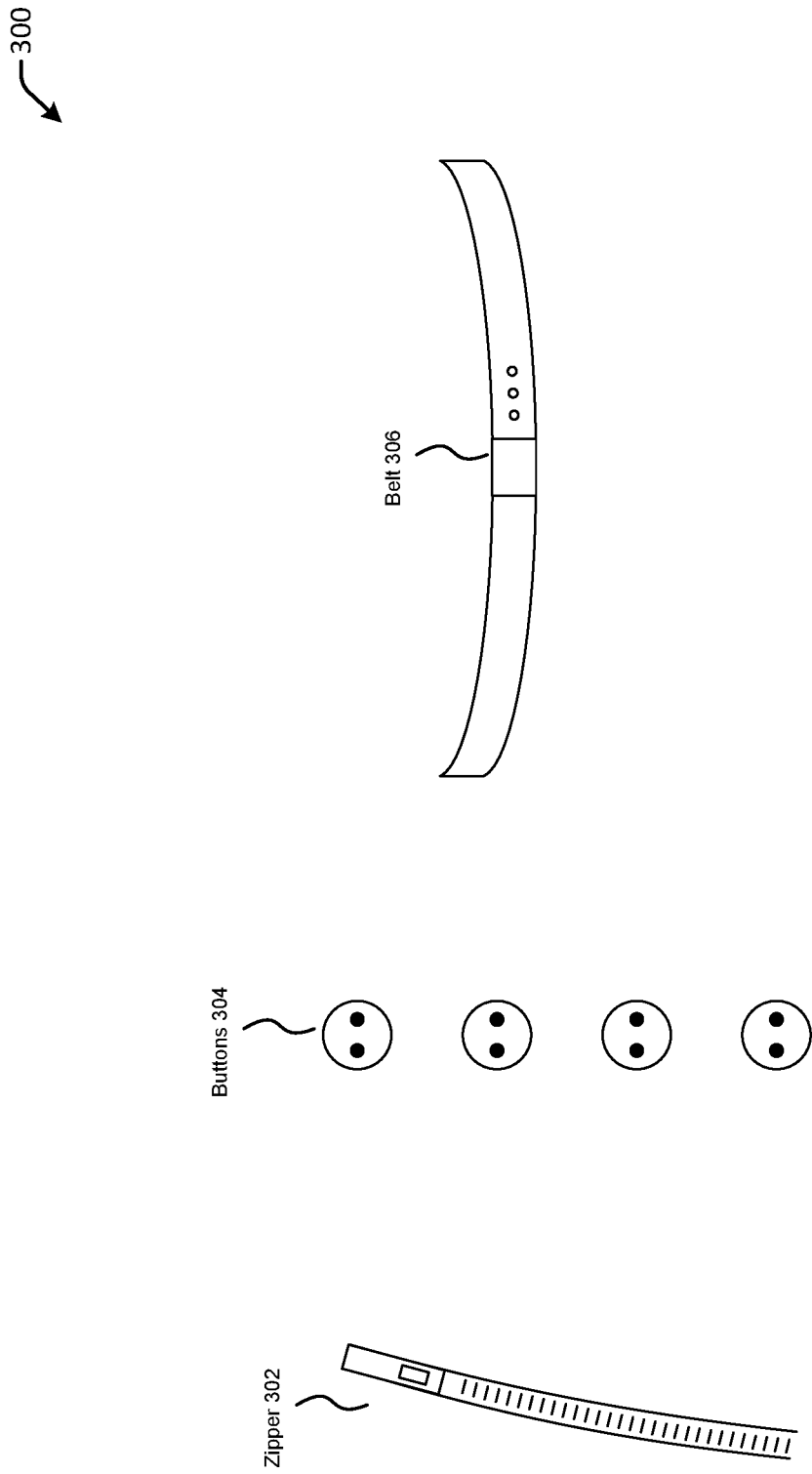
FIG. 3 illustrates notions identified from a technical flat.

FIG. 3 illustrates notions 300 identified from a technical flat. As illustrated, zipper 302, buttons 304, and belt 306 have been tagged by a computer-vision assisted notion identifier 110. In addition to detecting the notions themselves, notion identifier 110 may determine the materials each notion is composed of and/or how each notion is affixed to the underlying panel. Auto-check API 106 may add a list of notions and the materials they are made out of to bill of materials 116.

FIG. 4 illustrates panels 400 of fabric that the design 104 is composed of Similar to the panels depicted in FIG. 2B, FIG. 4 depicts Drawstrings 410, waistband 412, right leg 414, left leg 416, right cuff 418, left cuff 420, notches 428, pocket 440, waistband 442, right leg 444, left leg 446, right cuff 448, left cuff 450, and notches 458.

FIG. 4 also illustrates equations 470, and 472. As discussed above in conjunction with FIG. 1, geometric pattern analyzer 108 may identify mathematical descriptions of the edges of panels 400. As illustrated, equation 470 defines the right edge of left leg 416, while equation 472 defines the bottom edge of left leg 416. Equations 470 and 472 are illustrative of equations that geometric pattern analyzer 108 generates for each edge of each panel 400.

FIG. 4 additionally depicts points of measure 424 and 454. Points of measure indicate where edges of a panel intersect, the apex of a curved edge of a panel, an inflection point of a spline, where two panels are to be affixed together, where one panel is to be affixed on top of another panel, or the like. Points of measure 424 and 454 are representative of the other squares that appear along the contours of individual panels in FIG. 4. Point of measure 424 may be identified as the intersection between the lines defined by equations 470 and 472.

There are a number of ways in which mathematical descriptions of panels may be obtained. The panels illustrated in FIG. 4 may have been imported directly from a computer-readable mathematical description. However, if design 104 was provided as a flat image, the panels may first have been identified by geometric pattern analyzer 108. If design 104 is wholistic, geometric pattern analyzer may first segment the wholistic image into panels before converting each panel to a mathematical representation. As discussed above, lines, points, and curves within the design are identified that segment the design into individual panels that a manufacturer may cut out and sew together. The size of each panel—relative to each other and relative to a size reference—may also be determined. If design 104 is received as sets of panel images, then only the transformation to a mathematical representation of each panel is performed.

Once the mathematical description of the contours and sizes of each panel are determined, a technical file used by garment manufacturers may be generated that mathematically describes each panel. For example, a "drawing exchange format" or ".dxf" file is commonly used to encode the shapes and sizes of each panel. The format of the exported file may list points—e.g. points of measure and notches discussed below, text usable for annotations, lines— e.g. straight lines, splines, polynomials, etc.

In some configurations, before emitting the identified shapes into a file format that is compatible with the target manufacturer, the identified panels may be arranged so as to reduce the amount of wasted material that will be left behind after cutting the panels. Panels may be arranged this way even if design 104 was already depicted as individual panels. The opportunity to perform this optimization is one benefit of using computer vision to determine the size and shape of each panel.

In some configurations, panel arrangement may be parameterized on the number of garments to be produced. For example, the layout of a one-off shirt may be different than the layout when producing tens or one hundreds shirts. When producing larger number of garments, there is greater potential for more efficiently laying out panels so as to minimize fabric waste.

In addition to the contour (i.e. shape) and size of each panel, points of measurement may be determined for each panel. Points of measure (POM) identify distinguishing points along the edge of a panel, or within a panel. For example, a point of measure may be placed at the corners of a sleeve, indicating where that sleeve will align with an arm hole. The measurements for each POM are recorded in a spec sheet within the tech pack. Points of measure are important to convey to the factory how clothing is measured and described. A POM guide usually accompanies the spec sheet as part of the tech pack. For example, a POM guide may include a table explaining each point of measure and how to measure it with the sketch or photo of the garment.

POM descriptions often have standard abbreviations that are widely used within the apparel industry. The most commonly used ones are:
HPS-High Point shoulder or HSP-High shoulder point
CF-Center Front
CB-Center Back
SS-Side seam
AH-Armhole
NCK-Neck
FND-front neck drop
BND-back neck drop
SLV-SleevePoints Points of measure on the edge of a panel may be used in a grading algorithm—an algorithm used to adapt the garment to different sizes. Points of measure along the edge of a panel may also be used as matching points. The results of the grading algorithm may be emitted in a file, e.g. a .rul file, that refers to panels listed in the tech pack by an identifier. Based on the panel identifier, the grading algorithm indicates which dimensions need to change, and to what extent they need to change. For example, the grading algorithm may indicate that an extra-large shirt has a neck hole that is 20% larger than a medium shirt, while the waist is 50% larger. As such, for the front panel of the shirt, the length between the points of measure that define the collar would be 20% longer for an extra-large shirt, while the length between the points of measure that define the waist would be 50% longer.

Computer vision is a useful technique even if the designs are created digitally, and even if the design images are provided in a digital format, e.g. a CAD file. However, the file formats used by designers are often incompatible with the file formats used by manufacturers. Designers make pieces in "front-end" design software. They may use three-dimensional simulators that simulate how a design will look in real life. But when exporting from this front end software, the manufacturer uses software connected to the machines that manufacture the garments. Computer vision bridges this gap by allowing any input file format to be analyzed and used to generate the appropriate file format for the target manufacturer. Furthermore, even if the file formats are compatible, the specific annotations, points of measure, and other aspects of the format used by a particular manufacturer may not be known by the designer.

Some designer generated images may include points of measure. However, if points of measure are not included in the design, or if the points of measure are incomplete or appear in unexpected locations, a correctness engine within auto-check API 116 and/or feedback API 120 may identify them. For example, the correctness engine may analyze the identified panels, any points of measure that were extracted from the source image, and models from tech pack formats 112/manufacturer configurations 114 that indicate which points of measure are expected. Based on a comparison between the points of measure that were explicitly included in the source image and the points of measure determined to be appropriate based on the target manufacturer or tech pack format, omitted points of measure may be identified and presented to the designer for confirmation as part of feedback 118. A similar comparison identifies potentially superfluous points of measure. These potentially superfluous POMs may also be presented to designer 102 as candidates for deletion as part of feedback 118. As discussed above, one example of a point of measure is an intersection of two lines (splines, polynomials, etc.) that have been fitted to a portion of the edge of a panel.

In addition to points of measure, input images of a design may include notches that indicate how panels should be aligned when sewn together. Similar to points of measure, notches may be identified from a source image and analyzed to determine if they are consistent with other panels found in the source image—e.g. whether they do in fact line up correctly. If notches are not included in the source image, a designer may choose for a point of measure analysis engine within auto-check API 116 and/or feedback API 120 to add notches according to the requirements of the target manufacturer and/or target tech pack.

Some notions are not discernable from the image provided by the designer. For example, the use of hook and eye to affix two panels of a garment may not be discernable from a design image alone. In these cases, the designer may always be prompted as part of feedback 118 to indicate whether hook and eye or any other undetectable notion, fabric, or other aspect of the design is present.

FIG. 5 illustrates contents of a tech pack 130, which includes bill of materials 116. In addition to the image of the design 104 that was provided by designer 102 and the panels 400 extracted by geometric pattern analyzer 108, the generated bill of materials 116 includes a list of attributes 502 and suggested values 504. The list of attributes 502 may be determined by the tech pack format 112 or the manufacturing configuration 114 that the tech pack 130 targets. Different manufacturers 140 using different manufacturing equipment will require different attributes 502 in a tech pack. Some attributes 502 may differ due to terminology. Other attributes may differ due to preferences for particular measurements or units of measure. Different manufacturers 140 may also have different capabilities, and as such may require more or fewer attributes 502 accordingly. For example, some manufacturers may work with materials that other manufacturers do not, and so attributes 502 may be expanded accordingly to accommodate the additional materials.

Different manufacturers 140 may also place different restrictions on values 504 of attributes 502. These restrictions may be based on equipment limitations, material availability, quality requirements, etc. For example, an equipment limitation may not allow a particular type of thread for attaching a zipper.

Values 504 may be generated by auto-check API 106 and refined by designer 102 interacting with feedback API 120. For example, if the image analysis engine within auto-check API 106 and/or feedback API 120 determines that the garment has a belt loop, auto-check API 106 may determine the dimensions of the belt loop, the stitching used to make the belt loop, etc., and include them as values 504. Other attributes 502 that may be partially or completely identified by the image analysis engine include buttons, a collar, cuffs, drawcords, gathers, hems, necklines (front and back), peplums, pockets, a puff with elastic hem, ruffles, sleeve hems, side pockets, sleeves (left and right), straps, waistlines, and zippers. Feedback API 120 may present the generated tech pack 130 to user 102 to confirm, modify, add to, and/or delete the values 504.

Figure 6:
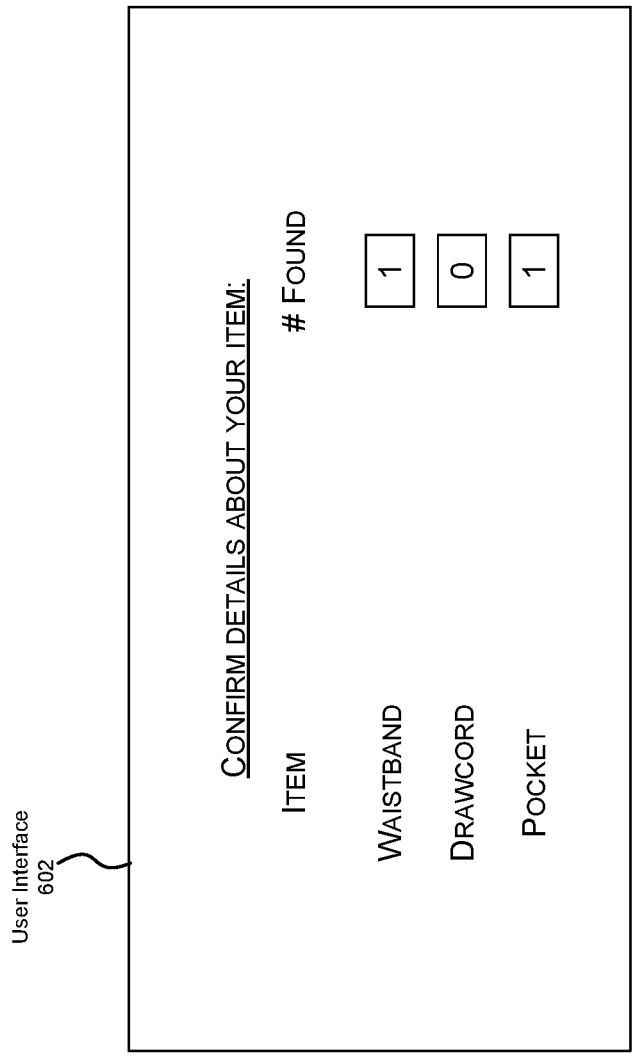
FIG. 6 illustrates a user interface to confirm the items placed into the bill of materials.

FIG. 6 illustrates a user interface that designer 102 may use as part of feedback 118 to confirm the items placed into the bill of materials 116. If an attribute identified by auto-check API 106 does not have a value, the designer 102 may be prompted to provide one. Continuing the example of a belt loop, user interface 602 may be presented to designer 102 to identify stitching used to affix the belt loop. If auto-check API 106 identified an armhole, the designer 102 may be presented the opportunity to indicate how much of a hem should be created, the type of stitching used to attach the hem, etc. The attributes presented and the values solicited from the designer 102 may be selected based on a target manufacturer 140, based the type of tech pack being generated, or other constraint. In this way, most if not all values are correctly provided by the designer in the first tech pack 130 provided to manufacturer 140—i.e. the attribute values that are provided are correct, and there are few if any missing attribute values.

Figure 7:
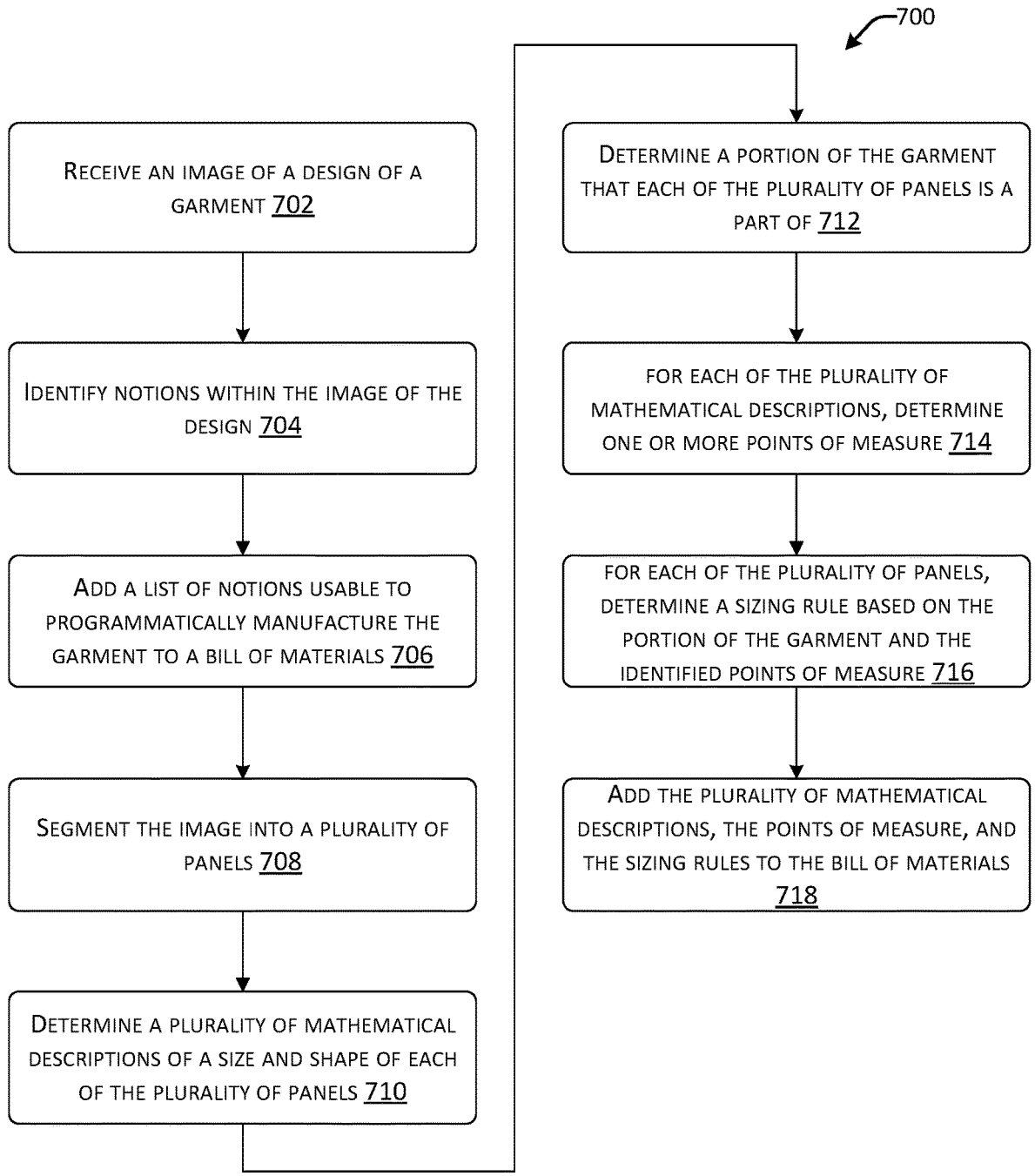
FIG. 7 is a flow diagram of an example method for automatic generation of fashion manufacturing tech packs from images using computer vision.

Turning now to FIG. 7, aspects of a routine for enabling a system 100 to automatically generate fashion manufacturing tech packs from images using computer vision is shown and described. For ease of understanding, the processes discussed in this disclosure are delineated as separate operations represented as independent blocks. However, these separately delineated operations should not be construed as necessarily order dependent on their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

At a high level, the routine 700 can be broken in the three steps: (1) identify pieces of the design 104—e.g. notions and panels—from a human perspective. Part of identifying these pieces is determining what they are called—e.g. collars, buttons, etc. (2) what their measurements are—e.g. size and shape—for interpretation by the machine that will cut them, and (3) how the sizes can be manipulated to create garments for different sized people. Garment sizing is not as simple as increasing the size of each panel equally in all dimensions. For example, the circumference of a collar often does not scale in proportion with other dimensions of a shirt.

With reference to FIG. 7, routine 700 begins at operation 702 where the system receives an image of a design 104 of a garment.

Next at operation 704, the system uses computer vision techniques to identify notions within the image of the design. In addition to identifying notions, e.g. button 304, zipper 302, etc., the materials each notion is made of may also be determined.

Next at operation 706, a list of notions usable to programmatically manufacture the garment is added to a bill of materials 116.

Next at operation 708, the image is segmented into a plurality of panels. When the design 104 is composed of panels, this operation may be skipped.

Next at operation 710, a plurality of mathematical descriptions of a size and shape of each of the plurality of panels is determined. When design 104 is composed of panels defined mathematically, this operation may be skipped.

Next at operation 712, a portion of the garment that each of the plurality of panels is a part of is determined. For example, one portion of a garment may be identified as a front of a sleeve, while another portion of the garment may be identified as the back of a shirt.

Next at operation 714, for each of the plurality of mathematical descriptions, one or more points of measure 424 are determined indicating how the panels are to be sewn together.

Next at operation 716, a sizing rule is determined for each of the plurality of panels based on the portion of the garment and the identified points of measure.

Next at operation 718, the plurality of mathematical descriptions, the points of measure, and the sizing rules are added to the bill of materials.

Figure 8:
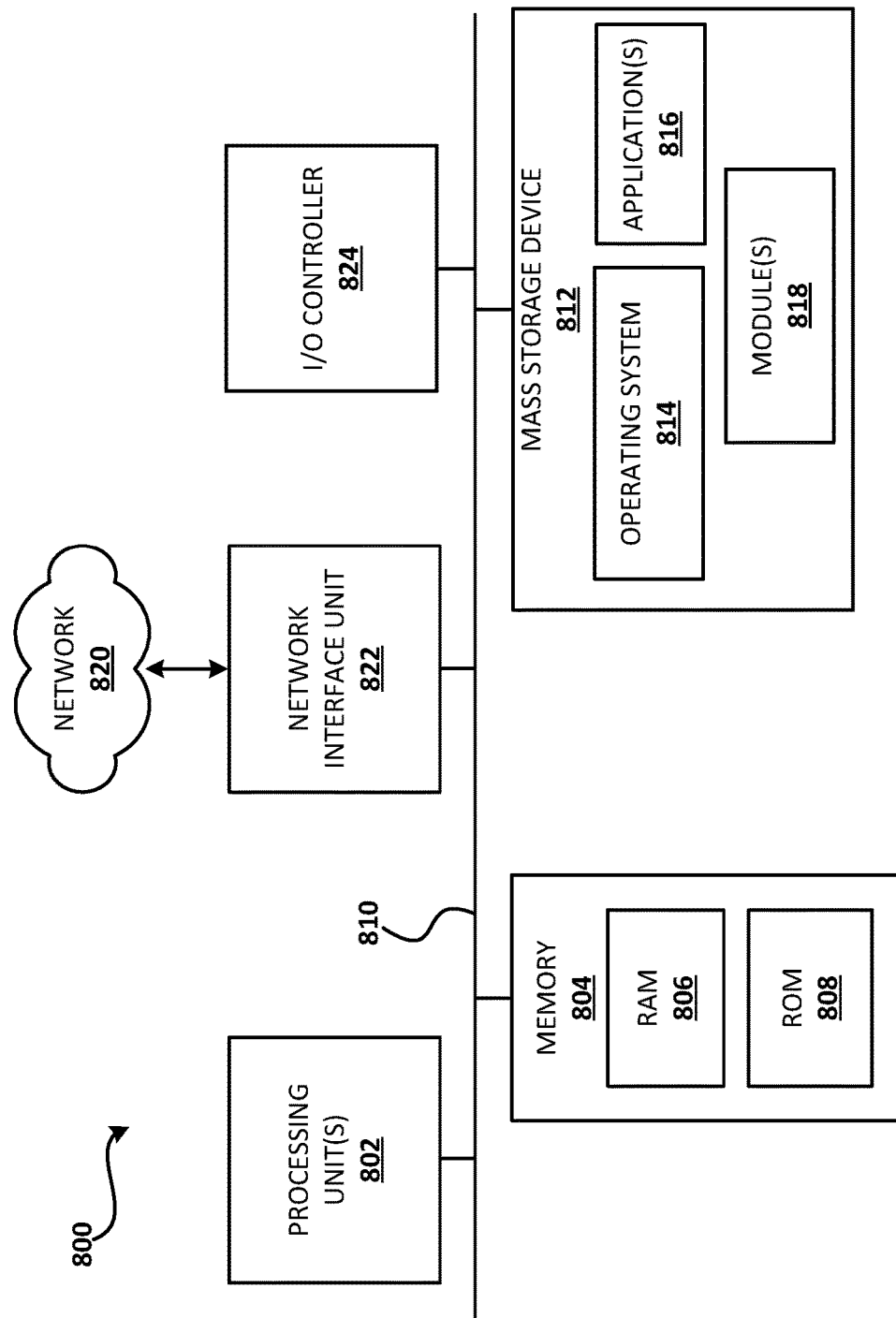
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as a computer or a server configured as part of the system 100, capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, modules 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810. The computer architecture 800 also may include an input/output controller 824 for receiving and processing input from a number of other devices, including a keyboard, mouse, touch, or electronic stylus or pen. Similarly, the input/output controller 824 may provide output to a display screen, a printer, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit (s) 802.

Figure 9:
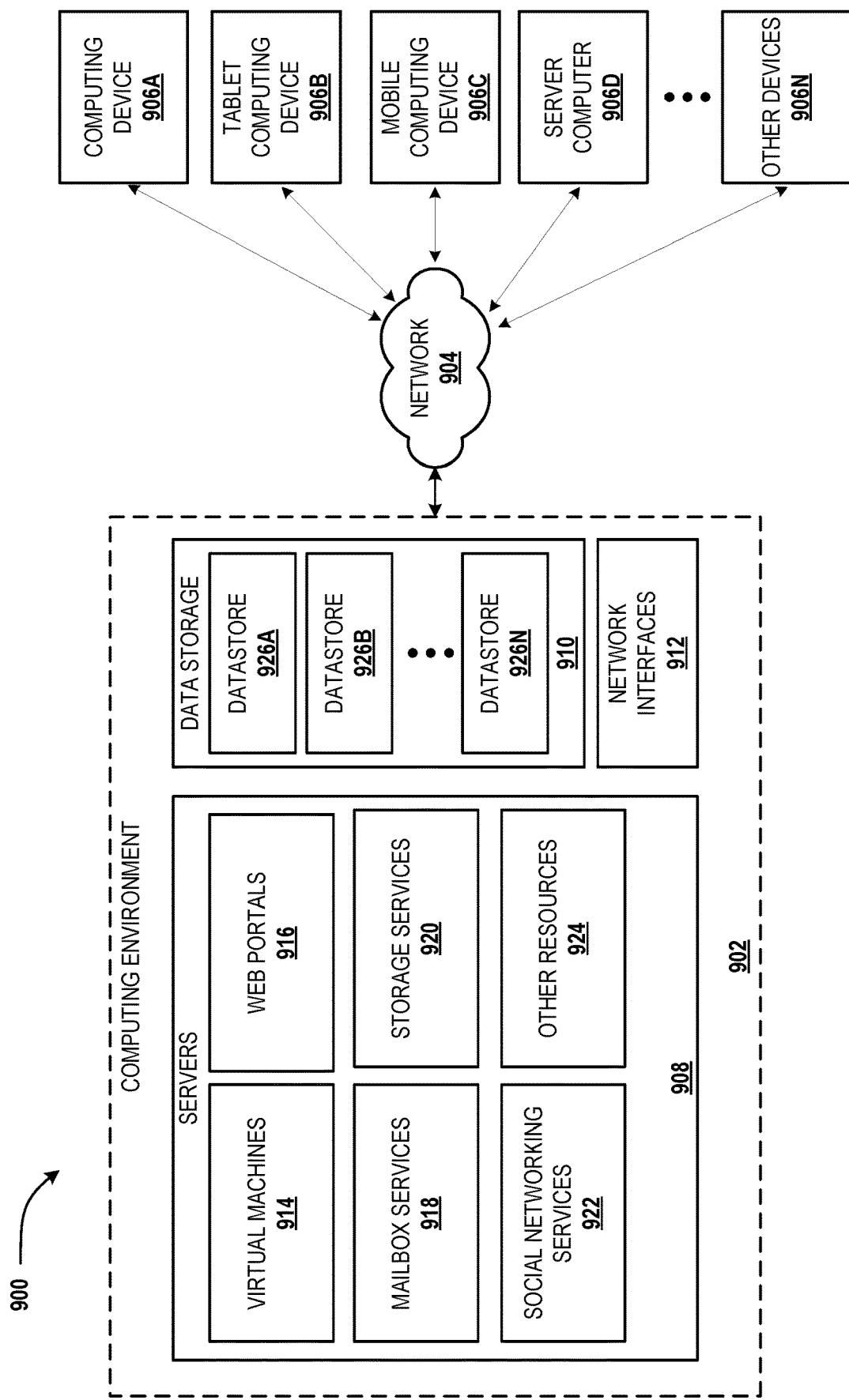
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 708 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

The present disclosure is supplemented by the following example clauses.

Example 1. A method comprising: receiving a design (104) of a garment; segmenting the design (104) into a plurality of panels (400); determining a mathematical description (470) of each of the plurality of panels (400); using the mathematical descriptions (470) of each of the plurality of panels (400), generating a plurality of attribute values (504) for each of the plurality of panels (400); using the mathematical descriptions (470) of each of the plurality of panels (400), generating a technical sketch (202, 204) of the garment; and generating a tech pack (130) comprising the plurality of attribute values (504) and the technical sketch (202, 204) of the garment, wherein the tech pack (130) is usable by a manufacturer to produce the garment.

Example 2: The method of Example 1, wherein segmenting the design into the plurality of panels comprises using a computer vision algorithm to identify contours of the plurality of panels.

Example 3: The method of Example 1, wherein the design of the garment comprises a mathematical description of a panel, and wherein segmenting the design into the plurality of panels comprises using computer vision to identify contours of the panel as one of the plurality of panels.

Example 4: The method of Example 1, wherein individual panels of the plurality of panels comprise a stencil usable to cut a piece of fabric for the garment.

Example 5: The method of Example 1, wherein the attribute values are generated for a list of attributes specific to a particular manufacturer.

Example 6: The method of Example 5, further comprising: applying manufacturer specific criteria to the attribute values to generate a list of warnings.

Example 7: The method of Example 6, further comprising: presenting the tech pack with the list of warnings for review; receiving a modification of the tech pack; and re-applying the manufacturer specific criteria to the attribute values of the modified tech pack.

Example 8. The method of Example 6, wherein the list of warnings includes omitted attribute values, attribute values that exceed manufacturer specific criteria, and inconsistencies within the tech pack.

Example 9: A computing device comprising: one or more processors; a memory in communication with the one or more processors, the memory having computer-readable instructions stored thereupon which, when executed by the one or more processors, cause the computing device to: receive a wholistic design (104) of a garment; using a computer vision algorithm, segment the design (104) into a plurality of panels (400); determine a mathematical description (470) of each of the plurality of panels (400); using the mathematical descriptions (470) of each of the plurality of panels (400), generate a plurality of attribute values (504) for each of the plurality of panels (400); using the mathematical descriptions (470) of each of the plurality of panels (400), generate a technical sketch (202, 204) of the garment; and generate a tech pack (130) comprising the plurality of attribute values (504) and the technical sketch (202, 204) of the garment, wherein the tech pack (130) is usable by a manufacturer to produce the garment.

Example 10: The computing device of Example 9, wherein the instructions further cause the processor to: identify a notion in the design; and add a list of notions to the tech pack Example 11: The computing device of Example 10, wherein the instructions further cause the processor to: identify a material used to manufacture the notion; and include a description of the material in the list of notions included in the tech pack.

Example 12: The computing device of Example 9, wherein determining the mathematical description of a panel of the plurality of panels comprises sampling a plurality of points along an edge of the panel and fitting a line to the plurality of points.

Example 13: The computing device of Example 9, wherein the instructions further cause the processor to: identify points of measure for a panel of the plurality of panels by identifying points where edges of the panel intersect.

Example 14: The computing device of Example 9, wherein the instructions further cause the processor to: identify points of measure for a panel of the plurality of panels by identifying inflection points or apexes of edges of the panel.

Example 15: The computing device of Example 9, wherein the instructions further cause the processor to: identify points of measure for a panel of the plurality of panels at locations where, as part of the wholistic design, the panel was connected to a different panel of the plurality of panels.

Example 16: A computer-readable storage medium comprising instructions that, when executed by a processor, cause the processor to: receive a design (104) of a garment; apply a computer vision algorithm to the design to identify a plurality of panels (400); determine a mathematical description (470) of each of the plurality of panels (400); using the mathematical descriptions (470) of each of the plurality of panels (400), generate a plurality of attribute values (504) for each of the plurality of panels (400); using the mathematical descriptions (470) of each of the plurality of panels (400), generate a technical sketch (202, 204) of the garment; and generate a tech pack (130) comprising the plurality of attribute values (504) and the technical sketch (202, 204) of the garment, wherein the tech pack (130) is usable by a manufacturer to produce the garment.

Example 17: The computer-readable storage medium of Example 16, wherein the design of the garment comprises a first plurality of mathematically defined panels, and wherein the instructions further cause the processor to: render the first plurality of mathematically defined panels as images, and wherein the computer vision algorithm is applied to the images to identify plurality of panels.

Example 18: The computer-readable storage medium of Example 16, wherein the instructions further cause the processor to: determine a portion of the garment that each of the plurality of panels is a part of; determine a sizing rule for each of the plurality of panels based on the portion of the garment that an individual panel is a part of and the identified points of measure of the individual panel; and add the sizing rule to the tech pack.

Example 19: The computer-readable storage medium of Example 16, wherein the instructions further cause the processor to: identify a notion within the garment design; and add a list of notions to the tech pack.

Example 20: The computer-readable storage medium of Example 19, wherein the notion comprises an adornment attached to the garment.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a design of a garment;
receiving a tech pack format of a manufacturer;
segmenting the design into a plurality of panels;
determining mathematical descriptions of the plurality of panels;
using the mathematical descriptions of the plurality of panels, generating a plurality of attribute values corresponding to a manufacturer-specific plurality of attributes described in the tech pack format, wherein the attribute values provide manufacturer-specific instructions for garment production;

using the mathematical descriptions of the plurality of panels, generating a technical sketch of the garment; and generating a tech pack comprising the plurality of attribute values and the technical sketch of the garment, wherein the tech pack is usable by the manufacturer to produce the garment.

2. The method of claim 1, wherein segmenting the design into the plurality of panels comprises using a computer vision algorithm to identify contours of the plurality of panels.

3. The method of claim 1, wherein the design of the garment comprises a mathematical description of a panel, and wherein segmenting the design into the plurality of panels comprises using computer vision to identify contours of the panel as one of the plurality of panels.

4. The method of claim 1, wherein individual panels of the plurality of panels comprise a stencil usable to cut a piece of fabric for the garment.

5. The method of claim 1, wherein the plurality of attribute values comprises a plurality of points of measure, and wherein the mathematical descriptions of the plurality of panels are used to generate the plurality of points of measure by identifying intersection points of lines defined by the mathematical descriptions of the plurality of panels.

6. The method of claim 1, further comprising:
applying a manufacturer specific criteria described in the tech pack format to the attribute values to generate a list of warnings.

7. The method of claim 6, further comprising:
presenting the tech pack with the list of warnings for review;
receiving a modification of the tech pack; and
re-applying the manufacturer specific criteria to the attribute values of the modified tech pack.

8. The method of claim 6, wherein the list of warnings includes omitted attribute values, attribute values that exceed manufacturer specific criteria, and inconsistencies within the tech pack.

9. A computing device comprising:
one or more processors;
a memory in communication with the one or more processors, the memory having computer-readable instructions stored thereupon which, when executed by the one or more processors, cause the computing device to:
receive a wholistic design of a garment;
receive a tech pack format of a manufacturer;
using a computer vision algorithm, segment the design into a plurality of panels;
determine mathematical descriptions of the plurality of panels;
using a machine learning model, generate a plurality of attribute values corresponding to a manufacturer-specific plurality of attributes described in the tech pack format, wherein the attribute values provide manufacturer-specific instructions for garment production, and wherein the plurality of attribute values comprise descriptions of notions or a description of a material of the garment;
using the mathematical descriptions of the plurality of panels, generate a technical sketch of the garment; and generate a tech pack comprising the plurality of attribute values and the technical sketch of the garment, wherein the tech pack is usable by the manufacturer to produce the garment.

10. The computing device of claim 9, wherein the instructions further cause the processor to:
identify a notion in the design; and
add a list of notions to the tech pack.

11. The computing device of claim 10, wherein the instructions further cause the processor to:
identify a material used to manufacture the notion; and
include a description of the material in the list of notions included in the tech pack.

12. The computing device of claim 9, wherein determining the mathematical description of a panel of the plurality of panels comprises sampling a plurality of points along an edge of the panel and fitting a line to the plurality of points.

13. The computing device of claim 9, wherein the instructions further cause the processor to:
identify points of measure for a panel of the plurality of panels by identifying points where edges of the panel intersect.

14. The computing device of claim 9, wherein the instructions further cause the processor to:
identify points of measure for a panel of the plurality of panels by identifying inflection points or apexes of edges of the panel.

15. The computing device of claim 9, wherein the instructions further cause the processor to:
identify points of measure for a panel of the plurality of panels at locations where, as part of the wholistic design, the panel was connected to a different panel of the plurality of panels.

16. A non-transitory computer-readable storage medium comprising instructions that, when executed by a processor, cause the processor to:
receive a design of a garment;
receive a tech pack format of a manufacturer;
apply a computer vision algorithm to the design to identify a plurality of panels;
determine mathematical descriptions of the plurality of panels;
using a machine learning model, generate a plurality of attribute values corresponding to a manufacturer-specific plurality of attributes described in the tech pack format, wherein the attribute values provide manufacturer-specific instructions for garment production, and wherein the plurality of attribute values comprise descriptions of notions or a description of a material of the garment;
using the mathematical descriptions of the plurality of panels, generate a technical sketch of the garment; and
generate a tech pack comprising the plurality of attribute values and the technical sketch of the garment, wherein the tech pack is usable by the manufacturer to produce the garment.

17. The non-transitory computer-readable storage medium of claim 16, wherein the design of the garment comprises a first plurality of mathematically defined panels, and wherein the instructions further cause the processor to:
render the first plurality of mathematically defined panels as images, and wherein the computer vision algorithm is applied to the images to identify plurality of panels.

18. The non-transitory computer-readable storage medium of claim 16, wherein the instructions further cause the processor to:

determine portions of the garment that the plurality of panels are a part of;
determine sizing rules for the plurality of panels based on the portions of the garment that individual panels are a part of and the identified points of measure of the individual panels; and
add the sizing rules to the tech pack.

19. The non-transitory computer-readable storage medium of claim 16, wherein the instructions further cause the processor to:
identify a notion within the garment design; and
add a list of notions to the tech pack.

20. The non-transitory computer-readable storage medium of claim 19, wherein the notion comprises an adornment attached to the garment.

* * * * *